(12) United States Patent
Bollmeyer et al.

(10) Patent No.: US 12,449,797 B2
(45) Date of Patent: Oct. 21, 2025

(54) OPERATION OF MEASURING DEVICES IN A PROCESS PLANT

(71) Applicant: ABB Schweiz AG, Baden (CH)

(72) Inventors: Stefan Bollmeyer, Minden (DE); Armin Dittel, Minden (DE); Holger Grosse, Minden (DE); Georg Horst, Northeim (DE); Tilo Merlin, Linsengericht (DE); Dirk Wagener, Stadthagen (DE)

(73) Assignee: ABB Schweiz AG, Baden (CH)

( * ) Notice: Subject to any disclaimer, the term of this patent is extended or adjusted under 35 U.S.C. 154(b) by 510 days.

(21) Appl. No.: 17/903,726

(22) Filed: Sep. 6, 2022

(65) Prior Publication Data
US 2023/0073341 A1 Mar. 9, 2023

(30) Foreign Application Priority Data
Sep. 7, 2021 (EP) .................................. 21195346

(51) Int. Cl.
*G05B 23/02* (2006.01)
(52) U.S. Cl.
CPC ..... *G05B 23/0221* (2013.01); *G05B 23/0289* (2013.01)
(58) Field of Classification Search
CPC ............ G05B 23/0221; G05B 23/0289; G05B 2219/25428; G05B 2219/33331; G05B 19/042
See application file for complete search history.

(56) References Cited

U.S. PATENT DOCUMENTS

| | | | |
|---|---|---|---|
| 8,219,216 B2 * | 7/2012 | Klug | H04L 69/18 700/20 |
| 2002/0099455 A1 | 7/2002 | Ward | |

(Continued)

FOREIGN PATENT DOCUMENTS

| | | |
|---|---|---|
| AU | 2020103213 A4 | 1/2021 |
| CN | 110475736 A | 11/2019 |
| CN | 111466130 A | 7/2020 |
| EP | 2354869 A2 | 8/2011 |
| WO | WO 2019/073183 A1 | 4/2019 |

OTHER PUBLICATIONS

ABB, "ABB Ability™ System 800xA: The Ethernet I/O Field Kit with xStream Commissioning," Datasheet, 2 pp. (2021).

(Continued)

*Primary Examiner* — Manuel A Rivera Vargas
(74) *Attorney, Agent, or Firm* — Leydig, Voit & Mayer, Ltd.

(57) ABSTRACT

A system and method for operating measuring devices in a process plant includes providing at least one measuring device for detecting at least one measuring variable, the measuring device having comprises at least one memory means for storing actual configuration data; providing at least one controller unit having at least one additional memory means in which projected configuration data is stored; the controller unit does not have write access to the measuring device with respect to the actual configuration data; and wherein the at least one measuring device and the at least one controller unit are connected via at least one network; comparing the actual configuration data and the projected configuration data, and when the configuration data correspond, allowing a data communication.

10 Claims, 2 Drawing Sheets

(56) References Cited

U.S. PATENT DOCUMENTS

| | | | |
|---|---|---|---|
| 2010/0161251 A1* | 6/2010 | D'Angelico | G01F 23/2967 |
| | | | 702/54 |
| 2012/0197480 A1* | 8/2012 | Beninca | B64F 5/60 |
| | | | 701/29.9 |
| 2020/0106743 A1 | 4/2020 | Park et al. | |
| 2020/0285737 A1 | 9/2020 | Kraus et al. | |
| 2021/0029106 A1 | 1/2021 | Breitenbach et al. | |

OTHER PUBLICATIONS

Fieldcomm Group, "PA-DIM™ Process Automation Device Information Model: OPC UA for Process Automation Devices," FCG TS10098, Edition 1.0, 52 pp. (Apr. 23, 2020).

Namur, "Specifications for Integrating Fieldbus Devices in Engineering Tools for Field Devices," NE 105, 14 pp. (Feb. 24, 2016).

OPC Foundation, "OPC UA for Process Automation Devices—PA-DIM™," OPC 30081, Release 1.0.2, 52 pp. (Jul. 21, 2021).

PROFIBUS & PROFINET, "Profile for Process Control Devices: Technical Specification for PROFIBUS and PROFINET," Version 4.01, Order No. 3.042, 284 pp. (Nov. 2020).

European Patent Office, Extended European Search Report in European Patent Application No. 21195346.8, 8 pp. (Feb. 25, 2022).

The Patent Office of the People's Republic of China, Office Action in Chinese Patent Application No. 202211083243.7, 9 pp. (Oct. 29, 2024).

China National Intellectual Property Administration, Office Action in Chinese Patent Application No. 202211083243.7, 8 pp. (Jun. 4, 2025).

\* cited by examiner

OPERATION OF MEASURING DEVICES IN A PROCESS PLANT

CROSS-REFERENCE TO RELATED APPLICATIONS

This patent application claims priority to European Patent Application No. 21195346.8, filed on Sep. 7, 2021, which is incorporated herein in its entirety by reference.

FIELD OF THE DISCLOSURE

The present disclosure relates to a method for operating measuring devices in a process plant, a system for operating measuring devices in a process plant, a use of a measuring device, a controller unit and/or a configuration unit in such a system and a computer program element configured to carry out the steps of such a method.

BACKGROUND OF THE INVENTION

The main feature of a process control system is to measure process variables at measuring points, to process them in control loops or control chains and to derive control variables from them, which influence the process via actuators.

The planning and configuration of such a process control system always has the process or the method as the reference, in which it is specified at which point which variable is to be measured or at which point an intervention is to take place. These measuring and control points (German: Mess- and Regelstellen; MSR-Stellen) are identified in the context of a process plant by a unique identifier, TAG. In order to derive the configuration of a process control system from the process description, these measuring and control points are considered in different work sections.

Two important work sections are the so-called controller engineering and the field device engineering. Starting from the unique identifier (TAG) and the physical variable with its unit, which is to be measured or influenced by the actuator, different aspects of a measuring point are to be considered in the two work sections. After the basic engineering, this creates two strands in the planning and configuration process that must be brought together again during commissioning to ensure consistent operation of the plant. These two strands must also be monitored for consistency during operation.

The controller engineering strand considers, for example, in which control loops or control chains measured variables are to be processed, which scaling or conversions are necessary in order to be combined with other values or to be processed in controllers, or at which limits in which units process alarms are to be generated. The physical quantity (e.g. temperature, flow, pressure, etc.) as well as the unit are relevant for this. The sum of these data together with the control logic for the actuator and control loops are part of the controller configuration data, which is managed in a controller configuration tool. In addition, controller engineering considers which channels are used to acquire the measurement data, what update rates are required for this, what computing load is created on the controllers or communication load on the networks, and how this results in the need for controller, network and IO hardware and their interconnection. This also gives rise to further configuration data (so called data communication parameters), which is stored in the controller configuration tool, but potentially also in other tools, e.g. for the network.

The field device engineering strand considers, among other things, which measuring devices are suitable for measuring the desired variable under the given process conditions. Here, the selection of the measuring principles takes place (e.g. for flow via differential pressure, electromagnetic measurement, Coriolis measurement, ultrasonic measurement, etc.), as well as the selection of suitable materials depending on the process media or ambient conditions. In this engineering strand, the data required to procure the specific measuring devices for each measuring and control point is generated. In addition, parameterization specifications for the measuring devices at the respective measurement and control points are also created in order to configure the measuring devices for the explicit measurement or control task at this measurement and control point. This configuration data is typically held in a device engineering database.

In both strands, data is created that relates to the measuring device, is managed in the respective tools or is under the sovereignty of these tools, but partly overlaps in terms of content.

During the start-up, the data from the various tools of the engineering strands are loaded into the corresponding controllers and measuring devices. In the process, data is loaded e.g. from the engineering databases into special configuration or online tools that can communicate with the explicit hardware in a standardized or proprietary manner in order to store the data in the plant hardware and activate the necessary control and measurement or control algorithms.

A critical step in the start-up process is to ensure that the configuration data for a measurement and control point (especially the overlapping ones), which originated across the different engineering strands and may have been modified at different times with different information, fit together consistently. That is, it must be ensured that the assumptions in a controller configuration about the measured value and unit (and possibly also the scaling of a normalized measured variable) at a measurement and control point match the configurations in the device. For example, in the event of a fault, the control logic (the control loop) could be based on a temperature measurement in ° C., while the field device is set to ° F. This would not achieve the expected control behavior in the plant.

BRIEF SUMMARY OF THE INVENTION

It has now become apparent that there is a further need to provide a method for starting-up and operating measuring devices in a process plant.

In one aspect of the present disclosure, a method for operating and/or measuring devices in a process plant is disclosed, comprising at least the following steps:

Providing at least one measuring device for detecting at least one measuring variable, wherein the measuring device comprises at least one memory means in which actual configuration data for the operation of the measuring device is stored;

Providing at least one controller unit, wherein the controller unit comprises at least one memory means in which projected configuration data for the operation of the measuring device is stored; wherein the controller unit does not have write access to the measuring device with respect to the actual configuration data; and wherein the at least one measuring device and the at least one controller unit are connected via at least one network;

Comparing the actual configuration data and the projected configuration data, wherein if the configuration data correspond, a data communication with respect to the measuring variable is allowed, and if the configuration data do not correspond, a data communication with respect to the measuring variable is not allowed.

BRIEF DESCRIPTION OF THE SEVERAL VIEWS OF THE DRAWING(S)

DETAILED DESCRIPTION OF THE INVENTION

Figure 1:
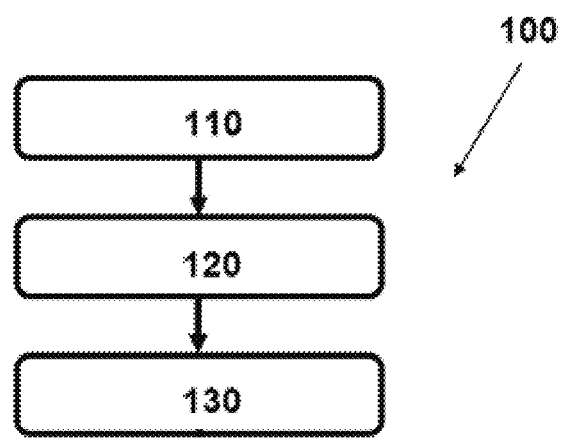
FIG. 1 shows a flow diagram of an example method for operating and/or starting-up measuring devices in a process plant in accordance with the disclosure.

In FIG. 1, a flow diagram of an exemplary method 100 for operating and/or starting-up measuring devices in a process plant is shown.

In step 110, at least one measuring device for detecting at least one measuring variable is provided, wherein the measuring device comprises at least one memory means in which actual configuration data for the operation of the measuring device is stored.

In step 120, at least one controller unit is provided, wherein the controller unit comprises at least one memory means in which projected configuration data for the operation of the measuring device is stored; wherein the controller unit does not have write access to the measuring device with respect to the actual configuration data; and wherein the at least one measuring device and the at least one controller unit are connected via at least one network.

In step 130, the actual configuration data and the projected configuration data are compared, wherein if the configuration data correspond, a data communication with respect to the measuring variable is allowed, and if the configuration data do not correspond, a data communication with respect to the measuring variable is not allowed.

Figure 2:
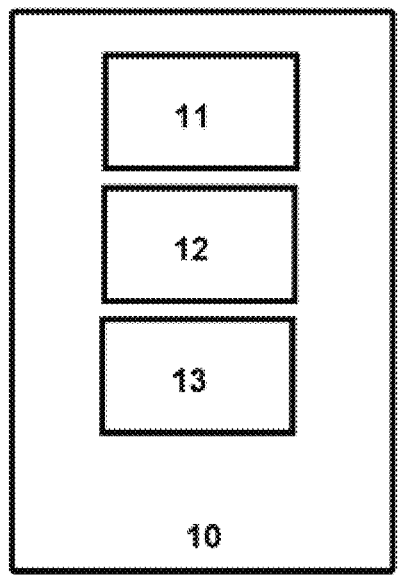
FIG. 2 shows a schematic illustration of an example system for operating measuring devices in a process plant in accordance with the disclosure.

FIG. 2 shows a schematic illustration of an example system 10 for operating measuring devices in a process plant, comprising: at least one measuring device 11 for detecting at least one measuring variable, wherein the measuring device 11 comprises at least one memory means in which actual configuration data for the operation of the measuring device is stored; at least one controller unit 12, wherein the controller unit 12 comprises at least one memory means in which projected configuration data of the measuring device 11 is stored; wherein the controller unit 12 does not have write access to the measuring device 11 with respect to the actual configuration data; and wherein the at least one measuring device 11 and the at least one controller unit 12 are connected via at least one network; at least one comparison unit 13 for comparing the actual configuration data and the projected configuration data, wherein if the configuration data correspond, a data communication with respect to the measuring variable is allowed, and if the configuration data do not correspond, a data communication with respect to the measuring variable is not allowed.

One main aspect of the present disclosure is based on keeping the two strands, i.e. the controller engineering strand and the field device engineering strand, which have already been created during engineering, separate also at the level of the configuration and commissioning/operation tools and establishing synchronization only at the level of the measuring device. In this concept, the measuring device is preferably given data sovereignty over the device configuration parameters that affect the measuring and control points, while the controller or controller configuration tool is given data sovereignty over the parameters that define the performance of the communication.

Figure 3:
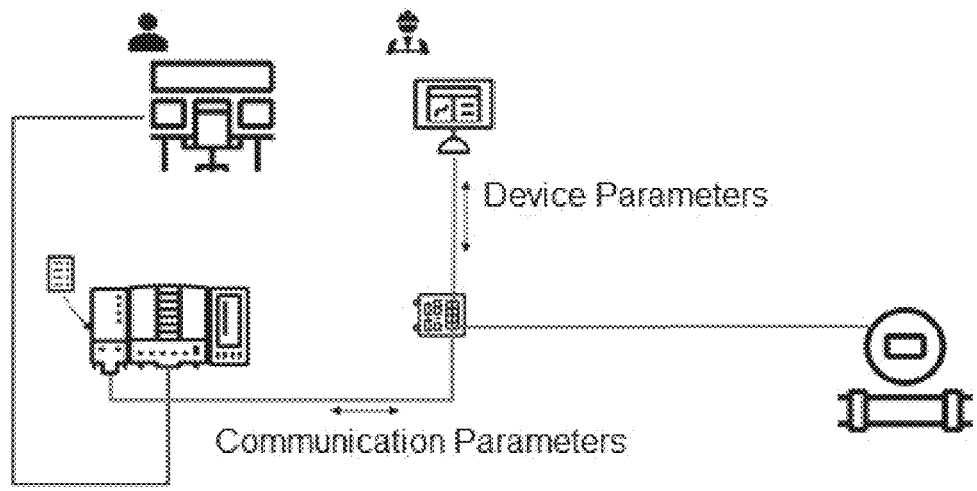
FIG. 3 shows a schematic illustration of an example separated logical system/network topology in accordance with the disclosure.

This may result in a separated logical system/network topology, as shown in FIG. 3. Depending on the configuration, the system tool and the device tool can of course be integrated with each other, but do not require any alignment interfaces at this tool level.

The alignment of these tools is done in particular by the Ethernet network protocols and by the functionality of the instrument. The domains controller configuration/commissioning and device configuration/commissioning are thus logically separated from each other. There are no more lifecycle dependencies between these domains as long as the corresponding network protocols are supported. The solution proposed here also supports the use of different tools, e.g. for different measuring devices, and can thus prevent a possibly undesired commitment to one tool with potential functional limitations.

In contrast to approaches commonly used today, the method in accordance with the present disclosure no longer relies on controllers or controller configuration tools to write device parameters to the measuring device. Instead, the parameters that the controller writes to the measuring device, either directly or indirectly via a network configuration tool, are limited to the communication parameters that are necessary to establish communication with the required performance, e.g. update rate. Otherwise, the controller preferably manages only the data to the measuring and control point site that is necessary to verify that the measuring device can actually provide the required data in the required format. Typically, this is information about the measurement principle, the unit, the unique identifier (TAG) of the measuring and control point and, if applicable, the data type of the expected digital measured value. The controller communicates this data to the measuring device and expects a response from the measuring device whether this data can be supplied based on the existing configuration and parameterization. If the response is positive, communication is started or the controller uses the process data for its application. In case of negative feedback, there is no data exchange concerning the measured value and preferably an information of the user.

The measuring device according to the present disclosure preferably has sole sovereignty over the configuration data and manages a state machine which, among other things, maps whether the measuring device is validly configured, whether the measuring device has responded positively or negatively to a request from a controller, whether it has been included in an active communication by a controller, and whether a configuration change has been made. In general, state machines in field devices are basically known from various fieldbus standards (e.g. PROFIBUS/PROFINET PA Profile 4.0). However, they are usually used to map the diagnostic state of the measuring device and to combine it with cyclically communicated data or to synchronize the operating modes of distributed control logic. Configuration counters or event mechanisms also exist to track parameter changes. However, none of these known mechanisms are fundamentally suited to resolve the challenge of multiple data sovereignty. The device of the present disclosure, on the other hand, can assume data sovereignty and thus the responsibility of keeping external users synchronized on state.

For this purpose, it can implement a novel state machine suitable for ensuring synchronization of device parameters, device configuration tools, and controllers or controller configuration tools.

As another element of the present disclosure, the device configuration tool may be used to communicate with the measurement device via a direct network connection. In a particular form of implementation, this device configuration tool may also be integrated directly into the device and accessible via a local interface or web browser.

Figure 4:
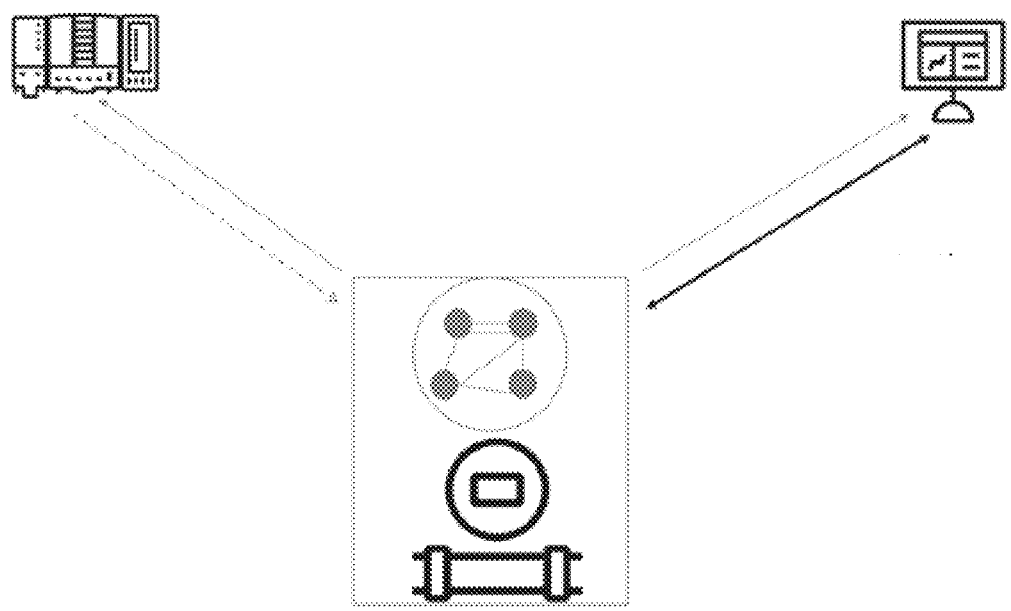
FIG. 4 shows a schematic illustration of an example of a measuring device in a network topology in accordance with the disclosure.

Based on monitoring of the network connection the measuring device and feedback from the measuring device's state machine, the device configuration tool can decide whether a download of device parameters is necessary to maintain or restore a valid device configuration/parameterization. Through its connection to the measuring device, the device configuration tool can also determine whether a connection has been requested from a controller and whether the request parameters have been confirmed (cf. FIG. 4).

In case of negative confirmation of the request parameters via the controller and/or the device configuration tool, the respective tools can indicate to the user that there is a discrepancy between actual configuration in the device and requested/projected configuration from the controller. This indicates that deviations from each other have occurred in the engineering strands controller and measuring device to this measuring and control point, which can only be eliminated by a decision of the user and his intervention (re-parameterization on controller or device side).

As long as such deviations have not occurred, commissioning can be fully automated as soon as the entities controller, measuring device and device configuration tool are connected in the network. In addition, changes during operation can be detected via these mechanisms and safe states can be assumed.

A preferred implementation of the solution is based on the PROFINET industrial Ethernet protocol. Here, mechanisms are provided for how the basic communication relationships (e.g. addressing, update rates, etc.) are exchanged. The necessary information that the controller has to verify with the measuring device according to this disclosure can be mapped in the standardized GSDML file. The GSDML file defines a structure of the cyclic data to be delivered, e.g. according to the PA profile 4.0 corresponding to the measuring principle used. In addition, the unit of the measured value and the unique identifier of the measuring and control point can be mapped as parameters in the GSDML file and fed with the corresponding values from the strand controller engineering. However, unlike the traditional fieldbus approach, according to this disclosure, this data is not written to the instrument as a configuration, but is only sent to the instrument for verification. That is, upon receipt, the device does not adopt these parameters into its configuration, but only checks whether they match the configuration present in the device and sets its state machine accordingly. In the case of deviating parameters, it also sets the status of the corresponding output signal to invalid to prevent values from being processed in the controller according to a faulty configuration. In addition, it provides a diagnostic message that enables the controller, via a connected controller configuration tool or an operating and monitoring unit, to display the reason for the negative feedback, e.g. "Device not configured" or "Configuration of the device deviates from requested parameters".

In parallel, the device configuration tool directly connected to the network can monitor the network for the presence of known or unknown measuring device. This device configuration tool may now be set to automatically download a configuration stored for this measuring device when it first detects it, which it has previously obtained via the device engineering strand, e.g. from a device engineering database, or to load it on-time from this database. However, the device configuration tool can also be designed to only recognize the device and leave the decision to download the data to the user.

Depending on its state machine, the measuring device can detect if it is already connected to a controller. If the existing (default) configuration in the measuring device or the downloaded configuration as initial configuration, supports the parameters previously requested by the controller, it can set the corresponding output signals to valid and reset the corresponding diagnostics. If a download from the device configuration tool invalidates a previously valid device configuration (matching the parameters requested by the controller), the device can set the corresponding channel to invalid. In this way, it can be prevented that a measuring device/field device is operated with a configuration that does not match the setting assumed/projected in the controller for the measuring and control point/station. In particular, it can be prevented that undetected deviations occur due to a modification of the device parameters during operation.

The controller can repeat its request at any time, but in particular also after changes to the configuration on the controller side or after disconnections, to check whether the projecting/assumptions about the device configuration still match its own configuration. The measuring device can detect a deviation and report it back to the controller accordingly, so that an exchange of faulty or unverified process data can be prevented. Likewise, the device configuration tool can periodically check the network for the presence of the measuring device and the state of the state machine. This mechanism can ensure that a device replacement is also detected and the replacement device is connected to the controller and provided with correct parameters using the same procedure.

Another preferred implementation is based on the OPC UA industrial protocol, which not only specifies communication mechanisms but also describes information models. Such an information model, e.g. PA-DIM, can be used to eliminate the need to use a description file. Based on the agreed information model, the device provides the process data as well as the information of its state machine and the parameters relevant for the controller (measuring principle, the unit, the unique identifier (TAG) of the measuring and control point) as a server. Using the OPC UA protocol, the controller as a client can browse this information model without any prior knowledge other than the information model itself, find the appropriate process data and query the associated critical parameters. If these queried parameters match the controller configuration, the process data exchange can be started, e.g. by the controller subscribing the corresponding process values. Since the device state machine information is available on the network, the device configuration tool connected to the network can also use it to detect un-configured measuring devices and provide them with the correct configuration.

Aspects of the present disclosure relate to computer program elements configured to carry out steps of the methods described above. The computer program element might therefore be stored on a computing unit of a computing device, which might also be part of an embodiment. This computing unit may be configured to perform or induce performing of the steps of the method described above. Moreover, it may be configured to operate the components of the above described system. The computing unit can be configured to operate automatically and/or to execute the orders of a user. The computing unit may include a data processor. A computer program may be loaded into a working memory of a data processor. The data processor may thus be equipped to carry out the method according to one of the preceding embodiments. This exemplary embodiment of the present disclosure covers both, a computer program that right from the beginning uses the present disclosure and computer program that by means of an update turns an existing program into a program that uses the present disclosure. Moreover, the computer program element might be able to provide all necessary steps to fulfill the procedure of an exemplary embodiment of the method as described above. According to a further exemplary embodiment of the present disclosure, a computer readable medium, such as a CD-ROM, USB stick, a downloadable executable or the like, is presented wherein the computer readable medium has a computer program element stored on it which computer program element is described by the preceding section. A computer program may be stored and/or distributed on a suitable medium, such as an optical storage medium or a solid state medium supplied together with or as part of other hardware, but may also be distributed in other forms, such as via the internet or other wired or wireless telecommunication systems. However, the computer program may also be presented over a network like the World Wide Web and can be downloaded into the working memory of a data processor from such a network. According to a further exemplary embodiment of the present disclosure, a medium for making a computer program element available for downloading is provided, which computer program element is arranged to perform a method according to one of the previously described embodiments of the present disclosure.

The present disclosure has been described in conjunction with a preferred embodiment as examples as well. However, other variations can be understood and effected by those persons skilled in the art and practicing the claimed invention, from the studies of the drawings, this disclosure and the claims. Notably, in particular, the any steps presented can be performed in any order, i.e. the present invention is not limited to a specific order of these steps. Moreover, it is also not required that the different steps are performed at a certain place or at one node of a distributed system, i.e. each of the steps may be performed at a different nodes using different equipment/data processing units.

In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The term "measuring devices" has to be understood broadly in the present disclosure and particularly includes any device, e.g. field devices, for measuring a process variable. Moreover, such a measuring device may also comprise or be connected to an actuator.

The term "controller unit" has to be understood broadly and particularly refers to electronic units or computer hardware that control certain processes in the process plant. According to the present disclosure, it is preferred that the controller unit does not have "write access" to the measuring device with respect to the configuration data, i.e. the controller unit is not able to rewrite/reconfigure the measuring device. Such a reconfiguring has to be performed by a different entity, e.g. by means of a configuration unit.

The term "actual configuration data" or actual measuring device parameters according to the present disclosure refers to the configuration data of a measuring device stored in the memory of the measuring device.

The term "projected configuration data" according to the present disclosure refers to the configuration data of the measuring device derived from the controller-engineering strand.

The term "communication parameters" according to the present disclosure refer to the parameters referring to the communication between the measuring device and the controller unit.

The term "configuration unit" has to be understood broadly and includes any device configured to write/reconfigure the actual configuration data/parameters in the measuring device. Notably, the configuration unit may be located anywhere in the network, e.g. in the measuring device, in any separate/integrated entity in the network. The configuration unit may also be provided as a computer program element, as embedded software, etc.

Any disclosure and embodiments described herein relate to the methods, the systems, the measuring devices, the computer program element lined out above and vice versa. Advantageously, the benefits provided by any of the embodiments and examples equally apply to all other embodiments and examples and vice versa.

As used herein "determining" also includes "initiating or causing to determine", "generating" also includes "initiating or causing to generate" and "providing" also includes "initiating or causing to determine, generate, select, send or receive". "Initiating or causing to perform an action" includes any processing signal that triggers a computing device to perform the respective action.

In an embodiment of the method, the controller unit transmits the projected configuration data to the measuring device and the comparing of the configuration data takes place in the measuring device.

In an embodiment of the method, the measuring device transmits the actual configuration data to the controller unit and the comparing of the configuration data takes place in the controller unit, and wherein the comparison result is transmitted to the measuring device.

In an embodiment of the method, the comparison result is stored in the memory means of the measuring device.

In an embodiment of the method, if the configuration data does not correspond, an error message is provided by the controller unit and/or by the measuring device.

In an embodiment of the method, the method further comprises:
  Providing at least one configuration unit, which is connected to at least the at least one measuring device via at least one network;
  Transmitting the comparison result to the configuration unit, wherein depending on the comparison result, modified configuration data is loaded into the measuring device and/or if the configuration data does not correspond, modified configuration data for the measuring device is loaded into the measuring device by the configuration unit.

In an embodiment of the method, the configuration unit is provided in the measuring device.

In an embodiment of the method, the comparison result is published and/or accessible across the at least one network.

In an embodiment of the method, the at least one network is based on a PROFINET protocol, an Ethernet IP protocol and/or an OPC UA (Open Platform Communications Unified Architecture) protocol.

In an embodiment of the method, the controller unit has write access to the measuring device with respect to the data communication parameters in the at least one network.

A further aspect of the present disclosure relates to a system for operating measuring devices in a process plant, comprising: at least one measuring device for detecting at least one measuring variable, wherein the measuring device comprises at least one memory means in which actual configuration data for the operation of the measuring device is stored; at least one controller unit, wherein the controller unit comprises at least one memory means in which projected configuration data of the measuring device is stored; wherein the controller unit does not have write access to the measuring device with respect to the actual configuration data; and wherein the at least one measuring device and the at least one controller unit are connected via at least one network; at least one comparison unit for comparing the actual configuration data and the projected configuration data, wherein if the configuration data correspond, a data communication with respect to the measuring variable is allowed, and if the configuration data do not correspond, a data communication with respect to the measuring variable is not allowed.

In an embodiment of the system, the system further comprises: at least one configuration unit connected to the at least one measuring device via the at least one network, wherein the configuration unit is configured to load modified configuration data into the measuring device depending on the comparison result and/or is configured to load modified configuration data to the measuring device if the configuration data does not correspond.

A further aspect of the present disclosure relates to a use of a measuring device, a controller unit and/or a configuration unit in a system as described above. Finally, a further aspect of the present disclosure relates to a computer program element with instructions, which, when executed on computing devices of a computing environment, is configured to carry out the steps of the method as described above in a system as described above.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for operating measuring devices in a process plant, comprising:

providing at least one measuring device for detecting at least one measuring variable, wherein the measuring device comprises at least one memory means in which actual configuration data for the operation of the measuring device is stored;

providing at least one controller unit, wherein the controller unit comprises at least one memory means in which projected configuration data for the operation of the measuring device is stored; wherein the controller unit does not have write access to the measuring device with respect to the actual configuration data; and wherein the at least one measuring device and the at least one controller unit are connected via at least one network;

comparing the actual configuration data and the projected configuration data, wherein if the configuration data correspond, a data communication with respect to the measuring variable is allowed, and if the configuration data do not correspond, a data communication with respect to the measuring variable is not allowed, wherein the at least one controller unit transmits the projected configuration data to the at least one measuring device and the comparing of the configuration data takes place in the at least one measuring device, wherein the at least one measuring device transmits the actual configuration data to the at least one controller unit and the comparing of the configuration data takes place in the at least one controller unit, and wherein a comparison result of the comparing of the actual configuration data and the projected configuration data is transmitted to the at least one measuring device;

providing at least one configuration unit that is connected to at least the at least one measuring device via at least one network;

transmitting the comparison result to the at least one configuration unit; and loading, by the at least one configuration unit, modified configuration data into the at least one measuring device based on the comparison result, or if the configuration data does not correspond, loading, by the at least one configuration unit, the modified configuration data into the at least one measuring device.

2. The method according to claim 1, wherein the comparison result is stored in the memory means of the measuring device.

3. The method according to claim 1, wherein when the configuration data does not correspond, an error message is provided by the controller unit and/or by the measuring device.

4. The method according to claim 1, wherein the configuration unit is provided in the measuring device.

5. The method according to claim 1, wherein the comparison result is published and/or accessible across the at least one network.

6. The method according to claim 1, wherein the at least one network is based on a PROFINET protocol, an Ethernet IP protocol and/or an OPC UA (Open Platform Communications Unified Architecture) protocol.

7. The method according to claim 1, wherein the controller unit has write access to the measuring device with respect to the data communication parameters in the at least one network.

8. The method according to claim 1, wherein the at least one measuring device is further configured to:

generate a diagnostic message including a reason for negative feedback; and transmit the diagnostic message to an operating and monitoring unit for display, the operating and monitoring unit connected to the at least one measuring device and/or the at least one controller unit.

9. The method according to claim 1, wherein the at least one measuring device sets an associated state machine based on the comparing of the actual configuration data and the projected configuration data.

10. A system for operating measuring devices in a process plant, comprising:

at least one measuring device for detecting at least one measuring variable, wherein the measuring device comprises at least one memory means in which actual configuration data for the operation of the measuring device is stored;

at least one controller unit, wherein the controller unit comprises at least one memory means in which projected configuration data of the measuring device is stored; wherein the controller unit does not have write access to the measuring device with respect to the actual configuration data; and wherein the at least one measuring device and the at least one controller unit are connected via at least one network;

at least one comparison unit for comparing the actual configuration data and the projected configuration data, wherein if the configuration data correspond, a data communication with respect to the measuring variable is allowed, and if the configuration data do not correspond, a data communication with respect to the measuring variable is not allowed, wherein the at least one controller unit transmits the projected configuration data to the at least one measuring device and the comparing of the configuration data takes place in the at least one measuring device, wherein the at least one measuring device transmits the actual configuration data to the at least one controller unit and the comparing of the configuration data takes place in the at least one controller unit, and wherein a comparison result of the comparing of the actual configuration data and the projected configuration data is transmitted to the at least one measuring device; and at least one configuration unit that is connected to the at least one measuring device via at least one network for transmitting the comparison result to the at least one configuration unit, and loading, by the at least one configuration unit, modified configuration data into the at least one measuring device based on the comparison result, or if the configuration data does not correspond, loading, by the at least one configuration unit, the modified configuration data into the at least one measuring device.

\* \* \* \* \*